Figure 1:
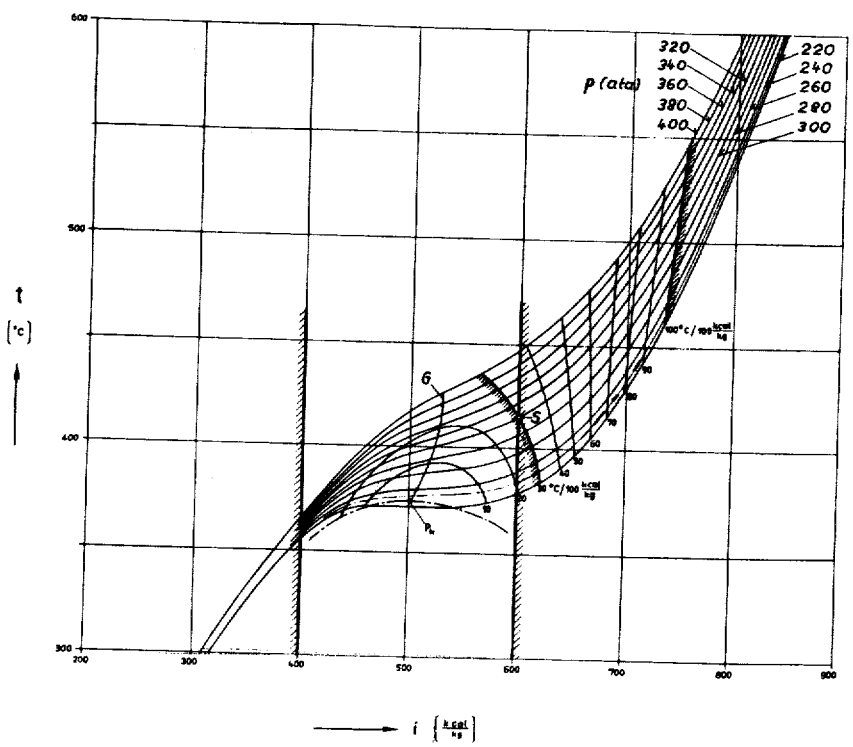

March 19, 1963  P. PROFOS  3,081,750
METHOD OF CONTROLLING A FORCED-CIRCULATION BOILER
OPERATING AT SUPERCRITICAL PRESSURE
Filed March 10, 1959  2 Sheets-Sheet 1

INVENTOR.
Paul Profos
BY
Pennie Edmonds Morton Barrows & Taylor
ATTORNEYS

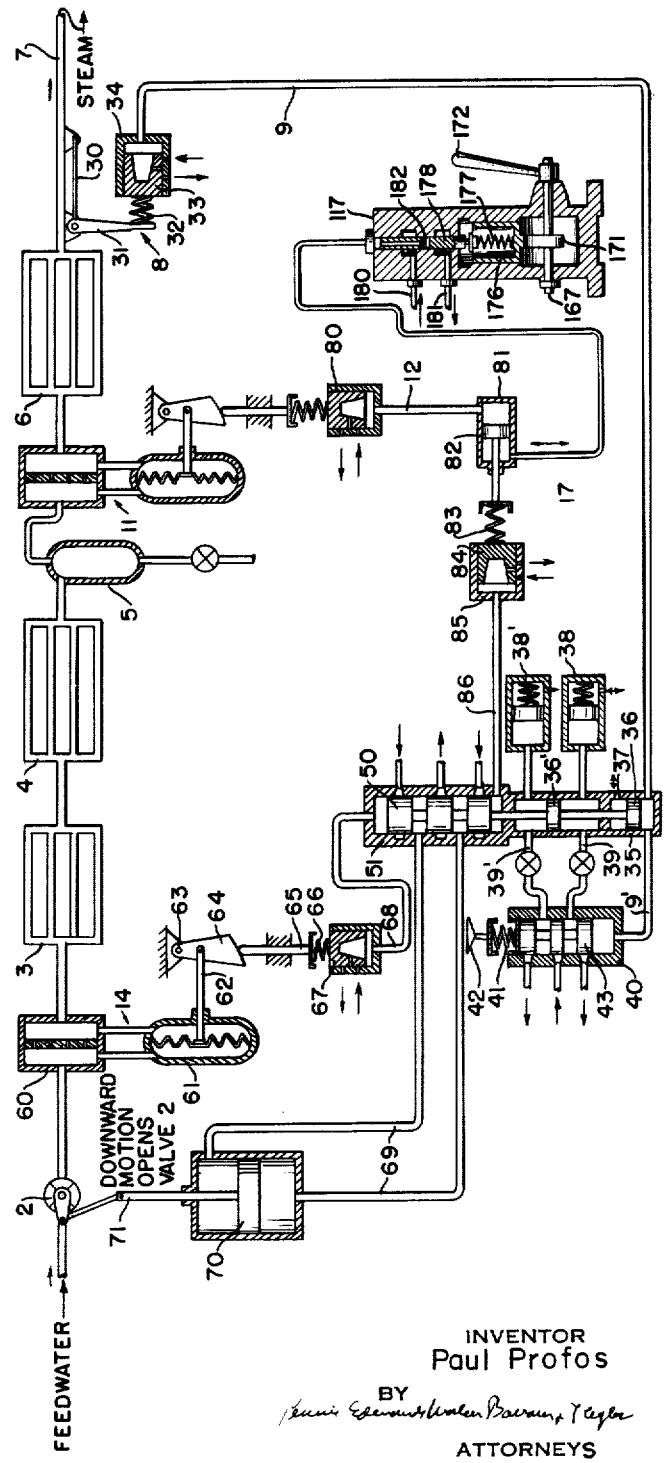

3,081,750
METHOD OF CONTROLLING A FORCED-CIRCULATION BOILER OPERATING AT SUPERCRITICAL PRESSURE
Paul Profos, Winterthur, Switzerland, assignor to Sulzer Freres, Societe Anonyme, Winterthur, Switzerland, a Swiss company
Filed Mar. 10, 1959, Ser. No. 798,464
Claims priority, application Switzerland Mar. 13, 1958
4 Claims. (Cl. 122—448)

This invention relates to a process for the control of a forced-circulation boiler operating at supercritical steam pressure in which the rate of feed water input is controlled with reference to the firing rate by means of a correction signal representative of the rate of flow of the working substance through the boiler and by means of a correction signal representative of the temperature of the working substance.

According to the invention the signal representative of the rate of flow of the working substance (steam) through the boiler is taken from a point in its evaporator tube system corresponding to conditions of the working substance graphically located on the temperature-heat content diagram between the limits of 400 and 600 kilogram calories per kilogram of heat working substance. Further according to the invention, the temperature signal is taken from a point in the boiler tube system corresponding to conditions of the working substance represented by a region on the temperature-heat content diagram bounded by isobars of 220 and 400 atmospheres absolute (kilograms per square centimeter) and by the isogradient lines of 30° and 100° C. per 100 kilogram calories per kilogram of working substance.

Advantageously, both signals are taken from measurements made at neighboring points in the tube system where the conditions of the working substance are described on the temperature-heat content diagram by the border region on that diagram which is included in both of the two regions of that diagram defined in the preceding paragraph. Alternatively it is particularly advantageous to make the temperature signal measurement at a point in the steaming tube system corresponding approximately to a condition of the working substance which may be graphically represented on the temperature-heat diagram by a point along or near the isogradient line of 70° C. per 100 kilogram calories per kilogram.

In the operation of a forced-circulation boiler at supercritical pressures according to the invention it is advantageous to adjust the rate of feed water input to match variations in the firing rate required by changes in the load to be carried by the plant by means of steam flow rate and steam temperature measurements as above described, in such fashion that the steam flow rate signal functions as a control or correction on the feed water input rate and in such fashion that the temperature signal is used as a control or correction on the feed water input rate.

The function of these two measured values is to make possible a dependable and stable regulation of the power plant which will nonetheless follow elastically changes in the load imposed thereon. This can however be achieved only when the signals are taken at the proper points in the evaporating tube system.

The invention will now be further described by reference to the accompanying drawings in which FIG. 1 is a graph useful in explaining the invention and FIG. 2 is a schematic diagram of a steam generating plant according to the invention.

It is moreover necessary to make the measurement of each quantity at a point in the system where the value of the measured quantity is characteristic of the condition of the working substance to be controlled, i.e. at points where the influence of other factors by comparison with that of the quantity to be measured is small. If the measurement locations are so selected, the corrections which may become necessary to compensate for a disturbing effect of other factors is small and may in fact be vanishingly small.

The conditions above identified as applicable to the proper derivation of the signal representative of the rate of steam flow which is to be used in control of the relation of feed water input rate to firing rate are best fulfilled when that signal is developed at a point in the steaming tube system where the increase in steam temperature per unit heat input is least. In two-phase operation of a steam generator with subcritical pressure of the working substance, this condition is fulfilled, for example, at or near the output end of the water-to-steam conversion zone where the steam is saturated. It is indeed known that in steam generators operated below critical pressure, the quantity of saturated steam drawn off at the water separator may be used as an index for control of the feed water supply rate.

In one-phase operation of a steam generator wherein the pressures are exclusively above the critical level, there is no sharply defined limit in the tube system beyond which saturated steam is not found. Instead, the progress of the working substance through the boiler is characterized by the fact that on the temperature-heat content diagram of FIG. 1 the constant pressure lines or isobars for 220 to 400 metric atmospheres, above the critical pressure, show points of inflection.

At these points the partial derivative of the temperature with respect to heat content $\delta t/\delta i$ is a minimum. The line G (FIG. 1) joining these points might be considered as an arbitrary limit between water and steam. A signal representative of rate of steam flow through the boiler taken from a measurement made at a point corresponding to the range of values defined by the line G consequently would, for one-phase operation of the system above the critical range have a value suitable for use as a control on the relation of feed water input rate to firing rate, which relation is to be made a function of instantaneous load. Behavior as hereinabove in this paragraph described however deteriorates substantially both below and above the zone defined by the flat portion of the isobars, which is limited between the heat content values 400 and 600 kilogram calories per kilogram.

At pressures below critical these heat content limits pass through the two-phase region of water and steam within which, in contrast to the conditions of operation according to the invention at supercritical pressure, a measurement of the rate of flow of the working substance is practically impossible.

With respect to the temperature measurement, the best results are to be expected when such measurement is made at a location in the boiler where the density of the working substance changes slowly with temperature and where furthermore the influence of pressure on the ratio $\delta t/\delta i$ is small. These conditions are theoretically fulfilled in the graph of FIG. 1 when the derivative $\delta t/\delta i$ is at a maximum. For such values however there exists the disadvantage already pointed out that signals taken at high temperatures lead to unstable operation. Moreover it is disadvantageous to take the two control signals from widely separated locations in the system, i.e. from points widely separated along the route followed by the working substance from input as feed water to output to the turbine or other load, since such an arrangement affects unfavorably the dynamic performance of the control circuit.

If tangents of given slope are drawn one to each of the isobars and parallel to each other, the points of tangency obtained are points of constant value for the derivative $\delta t/\delta i$. A line joining these points of tangency therefore represents a locus of uniform temperature change versus heat input gradient of the isobars. For various slopes of the tangents various such loci or "isogradients" may be obtained, these isogradients being identified each by a separate value of degrees per one hundred kilogram calories per kilogram of the working substance—abbreviated ° C./100 kg. cal./kg. In the region where the isogradients intersect the isobars vertically, i.e., in the range of isogradients between 60° C./100 kg. cal./kg. and 70° C./100 kg. cal./kg., the derivative $\delta t/\delta i$ is obviously independent of the pressure. A temperature signal, which indicates the temperature change caused by a specified change in heat content, taken in this region is accordingly substantially independent of pressure and is therefore particularly suitable for the control function of the invention.

The pressure dependency of the temperature signal increases as the location of the temperature measurement in the boiler is shifted toward positions represented by isogradients of lower value, and the error content of this signal accordingly increases also. The isogradient of 20° C./100 kg. cal./kg., the first one to intersect doubly the family of isobars, therefore lies outside the range of positions on the temperature-heat content diagram representative of conditions in the boiler suitable for extraction of the temperature signal. Consequently the lower limit of such positions may be taken to be that of isogradient of 30° C./100 kg. cal./kg. On the other hand, for the reasons of unstable operation already mentioned, the isogradient of 100° C./100 kg. cal./kg. may be taken as representative of the upper limit of such postions, additionally because of the undesired spatial separation of the temperature and rate of steam flow measuring points along the steam flow path in the boiler which ensues if isogradients of above 100° C./100 kg. cal./kg. are admitted in defining the region on the temperature-heat content diagram descriptive of conditions at points in the stream tube system of the boiler where the temperature measurement is to be made.

Consequently the temperature representative signal is to be taken from a point in the steam tube system wherein the conditions of the working substance are defined by the area in FIG. 1 limited by the 220 and 400 atmosphere isobars and by the 30° C./100 kg. cal./kg. and 100° C./100 kg. cal./kg. isogradients.

Further, if as is desirable the locations in the boiler of the rate of flow and temperature measurements are to be as close together as possible, they are advantageously disposed at locations in the system defined by the border region between the two already defined with respect to FIG. 1, for example such as the point S in FIG. 1 at which the heat content is 600 kg. cal./kg. and which lies on the isogradient of 30° C./100 kg. cal./kg.

Lastly, if maximum independence of pressure is to be achieved for the temperature signal, the temperature measurement should be made at locations represented by the limits between the isogradients of 60° C./100 kg. cal./kg. and 70° C./100 kg. cal./kg.

FIG. 2 shows a plant in which the method constituting the invention is applied. The numeral 2 designates an adjustable feed valve, 3 an economiser, 4 an evaporator heating surface, 5 a water separator used in the starting phase or under similar temporary operating conditions of the steam generator plant, 6 one of more superheaters and 7 the tubing connecting the parts mentioned and leading to a steam consumer, for instance a turbine, not shown in the drawing. The superheaters of which is shown the superheater 6 only are traversed by the working medium one after the other. The elements 3, 4, 6 and the other surpeheaters are of course exposed to a suitable source of heat, being enclosed for example in a firebox. Since the positional disposition of the elements 3, 4 and 6 with respect to the heat source forms no part of the present invention, the heat source has been omitted from the drawing. A feed water pump, driven by a suitable source of power, which is not shown, is arranged in the tubing 7 before the feed valve 2. Downstream of the superheater 6 (considered in the direction of flow of the working medium) there is a temperature measuring device 8 which measures the temperature in a region of the tube system in which the prevailing conditions of the working medium lie within an area of the T-i diagram enclosed on the one hand by the isobars $p=200$ kg. per sq. cm. abs. and $p=400$ kg. per sq. cm. abs. and on the other by the isogradients of these isobars $J'=30°$ C./100 kcal./kg. and $J'=100°$ C./100 kcal./kg. Between the water separator 5 and the superheater 6 there is a steam flow measuring device 11 which measures the flow in a region of the tube system in which the prevailing conditions of the working medium lie in the T-i diagram between the state values $i=400$ kcal./kg. and $i=600$ kcal./kg. Finally there is a feed-water flow measuring device 14 between the feed valve 2 and the economiser 3.

The temperature measuring device 8 has a rod 30 with a low coefficient of thermal expansion. The rod is connected at its right-hand end (as shown in the drawing) to tube 7, while its left-hand end is hinged to a double-armed lever 31, one end of which lies against tube 7 while the other end presses against a spring 32. This spring rests on a control piston 33. In the wall of the control cylinder 34 there are two passages through which a pressure medium can be supplied or discharged by pipes not shown in the drawing. In the control piston 33 there is a passage which lies between the passages in the cylinder wall when the piston is in its normal position. A control pipe 9 connects up to the right-hand end wall of cylinder 34 and leads into a cylinder 35. An extension 9' of this pipe leads out of this latter cylinder to another cylinder 40 containing a control valve 43. Cylinder 35 is divided into two chambers containing pistons 36 and 36' respectively. These two pistons are connected to each other by a rod. Piston 36' is also connected through a rod with a control valve 50 which can move in a cylinder 51 shown in the example illustrated as being integral with cylinder 35.

In the drawing there is a passage 37 in the wall of cylinder 35 above piston 36. This passage communicates with the atmosphere. Two cylinders 38 and 38' connect up to the wall of the chamber containing piston 36' on opposite sides of that piston. These cylinders, each of which contains a piston supported on a spring, serve as buffer spaces. Their purpose is to ensure that the increase in pressure produced when a certain quantity of liquid flows into the chamber is proportional to this quantity. Two pipes 39 and 39', each with a throttling device, connect up to the chamber on opposite sides of the piston 36' and lead to cylinder 40 containing the control valve 43. In this cylinder there are again three passages on the left, the two passages at top and bottom discharging the pressure medium into pipes not shown in the drawing, while the passage in the middle is for the supply of the pressure medium. The upper end of control valve 43 presses against a spring 41, which in its turn rests against a member 42 which can be adjusted by hand in the axial direction. By adjusting the member 42, the force of spring 41 and thus the desired value of the temperature can be altered. Cylinder 35 with the two pistons 36 and 36', control-valve cylinder 40, pipes 39 and 39' and the buffer cylinders 38 and 38' together form a control unit with a proportional-integral mode of action.

The flow measuring device 14 for feed water consists of a measuring orifice 60 fitted in tube 7 and communicating through two tubes with a diaphragm chamber 61. A rod 62 is joined at one end to the diaphragm in chamber 61, while its other end is hinged to a cam plate 64 which is free to swivel about a point 63. One end of a rod 65 lies against the cam surface of plate 64, while its other end presses upon a spring 66. The spring 66 rests on a control piston 67 which is of the same design as the control piston 33 of the temperature measuring device 8. A control pipe 68 leads from the cylinder of control piston 67 to the cylinder 51 of control valve 50. Like cylinder 40, cylinder 51 also has three passages, of which the two at the ends are connected to supply pipes for the pressure medium, while the middle passage leads into a discharge pipe. Two pipes 69 which connect up to the opposite side of cylinder 51 lead to a cylinder containing a piston 70. The adjustable feed water valve 2 is connected to the piston rod 71 of this piston. Control valve 50 with pipes 69 and piston 70 form a control unit with an integral action.

The steam flow measuring device 11 is of the same design as the feed water flow measuring device 14. The control pipe 12 leading away from its control cylinder 80 opens into a cylinder 81. In this cylinder 81 is a piston 82 whose piston rod presses on a spring 83 which in its turn lies against a control piston 84 moving in a cylinder 85. Piston 84 and cylinder 85 are of the same design as control piston 33 and control cylinder 34 of the temperature measuring device 8. A control pipe 86 leads from control cylinder 85 into a space above cylinder 35 and below control valve 50. A pipe 17 supplying pressure medium enters cylinder 81 in addition to control pipe 12. Pipe 17 leads to a load control device of a known type. The load control device may be of the type shown in my co-pending application Serial No. 640,196, filed February 14, 1957, now Patent No. 3,017,869. This device comprises a shaft 167 journaled in a housing 117 to which the pipe 17 connects. The shaft 167 is rotatable by means of a handle 172 in accordance with the load on the boiler. It carries a cam 171 of appropriate shape. In the housing there is slidably disposed a piston 176. Rotation of the cam controls the position of piston 176 and thereby the stress exerted on a spring 177. The stress of the spring 177 is communicated to a further piston 178, the space above which is hydraulically connected to the pipe 17. Hydraulic fluid is supplied to the load control device under pressure at a line 180 and an escape line is provided at 181. When the piston 178 is raised by handle 172, a channel 182 in that piston which communicates with the space above the piston is brought into communication with line 180, causing the pressure in line 17 to increase. When the piston 178 is allowed to fall by rotation of handle 172, the channel 182 is brought into communication with line 181, and the pressure in line 17 is allowed to decline. In the unit consisting of cylinder 81 and piston 82 the signals coming from control pipe 12 and from the load control device through pipe 17 are balanced against each other, and their difference is transmitted through control pipe 86 with a proportional action.

When the temperature of the working medium at the superheater outlet rises, this causes the lever 31 to turn counterclockwise, so that control piston 33 is moved to the right. This connects the supply of pressure medium into control cylinder 34 with the control pipe 9, so that an increased pressure is exerted on the underside of piston 36 by way of pipe 9, as well as on the underside of control valve 43 by way of pipe 9'. The pressure acting on piston 36 causes a displacement of the piston, so that the control valve 50 is also moved upwards (as shown in the drawing), thus permitting pressure medium to flow from the upper supply pipe of cylinder 51 through one of the two pipes 69 into the space above the upper surface of piston 70. This piston is therefore displaced downwards and valve 2 is opened. If the pressure now acting on control valve 43 exceeds the pressure corresponding to the desired value of the temperature set with the hand adjusting means 42, control valve 43 is also moved upwards and the pressure medium flows out of the supply pipe to cylinder 40 and through the connecting pipe 39 into the space below the underside of piston 36', so that, as a result of the action of the buffer cylinders 38, the control valve 50 is gradually moved in the same direction as it is moved by the pressure acting on piston 36. This displacement continues until an action is initiated in the opposite direction. This happens when the flow of feed water becomes excessive as a result of the further opening of the feed water valve, so that the pressure exerted on the upper surface of control valve 50 by the flow measuring device 14 acting through control piston 67 exceeds the pressure acting on the opposite side of valve 50. Valve 50 now moves downwards and the pressure medium flows through the respective pipe 69 into the space below piston 70, so that valve 2 closes gradually until a new equilibrium is established.

If for instance the intensity of firing is increased as a result of increased load by an adjustment of the load control device, the pressure acting through pipe 17 on piston 82 is reduced, piston 82 moves to the left in the drawing and as a result of a displacement of control piston 84 an increased pressure is transmitted through pipe 86 to the underside of control valve 50. This increased pressure moves the control valve 50 upwards in proportion with the change in the pressure in pipe 17. The upward movement of control valve 50 causes pressure medium to be supplied through the pipe 69 which opens into the space above piston 70, so that piston 70 moves downwards and valve 2 is opened. An increased quantity of water is therefore fed into the steam generator plant in accordance with the increased intensity of firing.

I claim:

1. In the operation of a once-through forced-circulation boiler employing water as the working substance therein and operating at supercritical pressure, said boiler being controlled by adjustment of feedwater input in response to rate of steam flow and steam temperature measurements, the method which comprises measuring the rate of steam flow at a point in the flow path of the working substance through the boiler where the heat content of the steam lies between 400 and 600 kilogram calories per kilogram, measuring the temperature of the steam at a point in the flow path of the working substance through the boiler where the condition of the steam, as represented on the temperature-heat content diagram for water, lies within an area bounded by isobars of 220 and 400 atmospheres absolute and by isogradients of these isobars of 30° C./100 kg. cal./kg. and 100° C./100 kg. cal./kg., and varying the rate of feedwater input to said boiler as a direct function of said measured temperature and of said rate of steam flow.

2. Method according to claim 1 in which said measurements are made at locations in said flow path at both of which the conditions of said working substance, as represented on the temperature-heat content diagram for water, lie within a first region bounded by the ordinates of 400 and 600 kilogram calories per kilogram and within a second region bounded by isobars of 220 and 400 atmospheres absolute and by isogradients of these isobars of 30° C./100 kg. cal./kg. and 100° C./100 kg. cal./kg.

3. In the operation of a once-through forced-circulation boiler employing water as the working substance therein and operating at supercritical pressure, said boiler being controlled by adjustment of feed water input rate in response to rate of steam flow and steam temperature measurements, the method which comprises measuring the rate of steam flow at a point in the flow path of said working substance through the boiler where the heat content of the steam lies between 400 and 600 kilogram calories per kilogram, measuring the temperature of the steam at a point in the flow path of said working substance through the boiler where the condition of the steam, as represented on the temperature-heat content diagram for water, lies within an area bounded by isobars of 220 and 400 atmospheres absolute and by isogradients of these isobars of 30° C./100 kg. cal./kg. and 100° C./100 kg. cal./kg., generating separate signals representative of said measured temperature and rate of steam flow, generating a first reference signal representative of a desired value for said temperature and a second reference signal representative of a rate of steam flow appropriate to the load on the boiler, comparing said temperature representative signals and comparing the rate of steam flow representative signals, and varying the rate of feedwater input to the boiler directly with excess of said measured temperature over said reference temperature and with excess of said measured steam flow rate over said appropriate steam flow rate.

4. In the operation of a once-through forced-circulation boiler employing water as the working substance therein and operated above critical pressure, the method of controlling the relation of feed water input rate to firing rate by reference to the rate of flow of steam through the boiler and by reference to the temperature of the steam in the boiler which comprises measuring the rate of flow of steam through the boiler at a point in its flow path where its condition corresponds to a point in a region on the temperature-heat content diagram for water between the limits of 400 and 600 kilogram calories per kilogram of steam, measuring the temperature of the steam at a point in its flow path through the boiler where its condition corresponds to a point in a region on the temperature-heat content diagram for water bounded by isobars of 220 and 400 absolute atmospheres and by isogradients of these isobars of 30° C./100 kg. cal./kg. and 100° C./100 kg. cal./kg., deriving signals representative of these measurements, generating a first reference signal representative of a desired value for said temperature, deriving from the load carried by said boiler a second reference signal representative of steam flow rate appropriate to such load, and adjusting said feedwater input rate upwardly for excess of said measured steam temperature representative signal over said first reference signal and of said measured rate of steam flow representative signal over said second reference signal and downwardly for excess of said first reference signal over said measured steam temperature representative signal and of said second reference signal over said measured rate of steam flow representative signal.

References Cited in the file of this patent

UNITED STATES PATENTS

| | | |
|---|---|---|
| 1,975,086 | Dickey | Oct. 2, 1934 |
| 2,072,887 | Kerr | Mar. 9, 1937 |
| 2,337,851 | Junkins | Dec. 28, 1943 |
| 2,804,851 | Smoot | Sept. 3, 1957 |

UNITED STATES PATENT OFFICE
CERTIFICATE OF CORRECTION

March 19, 1963

Patent No. 3,081,750

Paul Profos

It is hereby certified that error appears in the above numbered patent requiring correction and that the said Letters Patent should read as corrected below.

Column 1, line 24, for "the" read -- heat --; line 25, for "heat" read -- the --; column 6, line 32, after "input" insert -- rate --.

Signed and sealed this 29th day of October 1963.

(SEAL)
Attest:

ERNEST W. SWIDER
Attesting Officer

EDWIN L. REYNOLDS

Acting Commissioner of Patents